3,657,433
GASTROPODICIDAL COMPOSITIONS
Walter A. Darlington, Brentwood, and George F. Ludvik, Kirkwood, Mo., assignors to Monsanto Company, St. Louis, Mo.
No Drawing. Filed Sept. 18, 1969, Ser. No. 859,179
Int. Cl. A01n 9/20, 9/30
U.S. Cl. 424—235                                 3 Claims

ABSTRACT OF THE DISCLOSURE

Mixtures of sodium pentachlorophenate and a 3-substituted-2',5-dichloro-4'-nitrosalicylanilide for the destruction of adult gastropods and their eggs.

---

This invention relates to the destruction of adult gastropods and their eggs by applying to same and their habitat a gastropodicidally effective amount of a mixture on a molecular weight basis 0.092 to 0.112 mole of a 3-substituted - 2',5 - dichloro - 4' - nitrosalicylanilide of the formula

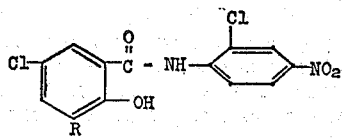

wherein R is phenyl, 4-chlorophenyl, tert. butyl, that is —C(CH$_3$)$_3$, or tert. pentyl, that is C$_2$H$_5$—C—(CH$_3$)$_2$, per mole of sodium pentachlorophenate.

Gastropods are members of the class of animal life Gastropoda of the phylum mollusca. They cause considerable agricultural and horticultural damage and of this class of animal life snail members are the necessary intermediate host or vector in the life cycle of various common parasites, as for example the trematodes or flukes which are parasitic in man causing schistomiasis and like diseases.

Sodium pentachlorophenate has long been known as a gastropodicide, however, it is difficult to handle because it functions as an irritant of the skin and mucous membranes necessitating the discomforting use of face masks and gloves, plus the known fact to obtain reasonable gastropodicidal results it must be employed at very high concentrations.

U.S. 3,375,160 describes 2',5-dichloro-4'-nitro-3-tert. butylsalicylanilide and 2',5-dichloro-4'-nitro-3-tert. pentylsalicylanilide, while U.S. 3,382,145 describes 2',5-dichloro - 4' - nitro - 3 - phenylsalicylanilide and 2',5-dichloro - 4' - nitro - 3 - (4 - chlorophenyl)salicylanilide. To illustrate this invention is the following:

Evaluation I—Adults

Six snails (*Planobarius corneus*, which is the species of snail host of the cyclocoelid *Tracheophilus sisowi* and the blood fluke *Bilharziella polonica*) of 6 to 8 weeks of age are placed in a 200 x 32 mm. glass tube (two replicates each of said six snail adults) and thereto is added an aqueous dispersion of known concentration in p.p.m. (that is, parts per million) of the compound or mixture of compounds itemized below. (These dispersions are prepared by dissolving the compound or mixture of compounds to be evaluated in sufficient acetone, and thereafter adding thereto sufficient water to provide aqueous dispersions of known concentration in p.p.m.) The LC$_{50}$, or the lethal concentration in p.p.m. to kill 50% of the adult snails (average of two replicates) at the end of 6 hours exposure time at 80° F. is as follows:

LC$_{50}$, in p.p.m.
Sodium pentachlorophenate _____ 3.00
Mixture [1] of sodium pentachlorophenate and 2',5-dichloro-4'-nitro-3-phenylsalicylanilide in a molar ratio of 1:0.1024 _____ 0.40

[1] This molar mixture corresponds to a parts by weight ratio of approximately 7 : 1.

Evaluation II—Eggs

A cluster of snail eggs (*Planobarius corneus*) of 1 to 18 hours of age are placed in a 200 x 32 mm. glass tube (two replicates of each cluster of snail eggs) and thereto is added an aqueous dispersion of known concentration in p.p.m. of the compound or mixture of compounds itemized below. (These dispersions are prepared as in Evaluation I hereinabove.) The LC$_{50}$, or the lethal concentration in p.p.m. to kill 50% of the snail eggs (average of two replicates) at the end of 48 hours exposure time at 80° F. is as follows:

LC$_{50}$, p.p.m.
2'5 - dichloro - 4' - nitro - 3 - phenylsalicylanilide _____ 0.75
Sodium pentachlorophenate _____ 0.40
Mixture of sodium pentachlorophenate and 2',5-dichloro - 4' - nitro - 3 - phenylsalicylanilide in a molar ratio of 1:0.1024 _____ [1] 0.30

[1] This amount is the sum of 0.263 p.p.m. of sodium pentachlorophenate and 0.0375 p.p.m. of 2',5-dichloro-4'-nitro-3-phenylsalicylanilide.

The gastropodicidal mixture of this invention is useful in combating a wide variety of other adult snails and their eggs, for example, the species *Australorbis glabratus*, an intermediate host of *Schistosoma mansoni* which is the cause of bilharziosis.

In combating the aquatic Gastropoda it is necessary to apply the gastropodicidal mixture of this invention to the waters or land areas adjacent thereto which form their habitats or egg-laying habitats, and therefore to be practical the mixture of compounds of this invention must exhibit gastropodicidal activity at relatively high dilutions, for example $10^{-5}$ to $10^{-8}$ by weight.

In combatting the adults or eggs of amphibious Gastropoda the mixture of compounds of this invention can be employed per se or formulated into a dust and dispersed or scattered on the ground along banks of streams, rivers, irrigation canals, or the edges of other bodies of water, e.g. the seashore, so that the amphibious Gastropoda will come in contact with the gastropodicidal agent mixture of this invention when it leaves the water and begins to travel across ground areas.

Where the Gastropoda, whether aquatic or amphibious, sought to be combatted has a water habitat the mixture of compounds of this invention can be added per se to the water, or in the form of a formulated dust cast on the surface of the water, or sprayed on the water in the form of a solution thereof or a liquid emulsion formulation thereof.

Inert finely divided solids for the formulation of gastropodicidal dusts of this invention include fuller's earth, diatomaceous earth, bentonite, talc, pyrophillite, soybean flour, wood flour, and walnut shell flour, which dusts preferably have a particle size of 5 microns or below and contain from 5 to 95 percent by weight of the mixture of compound of this invention. These dusts based on the total weight thereof can also contain from 0.1 to 15 percent by weight of an anionic or non-ionic surfactant or mixtures thereof to provide a "wettable" dust formulation. Liquid formulations can be prepared by dissolving the mixture of this invention in a suitable organic solvent such as acetone or butanone and sprayed as such or in admixture with a non-ionic or anionic surfactant or mixtures thereof to form a liquid emulsion formulation for spray purposes.

In all of the forms described above the formulations can be provided ready for use in combatting adult gastropods and their eggs or they can be provided in a concentrated form suitable for mixing with or dispersing in other extending agents. As illustrative of a particularly useful concentrate is an intimate mixture of a mixture of this invention with a water-soluble surfactant either non-ionic or anionic or mixtures thereof which lowers the surface tension of water in weight proportions of 0.1 to 15 parts of surfactant with sufficient of a mixture of compound of this invention to make 100 parts by weight. Such a concentrate is particularly adapted to be made into a spray for destroying various forms of gastropods by the addition of water thereto. As illustrative of such a concentrate is an intimate mixture of 50 parts by weight of a 7:1 weight ratio mixture of sodium pentachlorophenate and 2',5-dichloro-4'-nitro-3-phenylsalicylanilide and 5.0 parts by weight of a water-soluble non-ionic surfactant such as polyoxyethylene derivative of sorbitan monolaurate.

Another useful concentrate adapted to be made into a spray for combatting adult gastropods and their eggs is a solution (preferably as concentrated as possible) of a mixture of compounds of this invention in an organic solvent therefor, for example acetone, cyclohexanone or aceptophenone. The said liquid concentrate preferably contains dissolved therein a minor amount (e.g. 0.5 to 10 percent by weight of the weight of the new gastropodicidal agent mixture) of a non-ionic or anionic surfactant or mixtures thereof, which surfactant is also water-soluble. As illustrative of such a concentrate is a solution of a 7:1 weight ratio of sodium pentachlorophenate and 2',5-dichloro-4'-nitro-3-(4 - chlorophenyl)salicylanilide in cyclohexanone which solution contains dissolved therein a water-soluble alkylarylsulfonate anionic surfactant, e.g. sodium dodecylbenzenesulfonate.

Of the surfactants aforementioned in preparing the various emulsifiable, wettable or dispersible compositions or concentrates of this invention, the water-soluble anionic and non-ionic surfactants described in U.S. 2,846,398 are preferred. Of the anionic surfactants, the particularly preferred are the well-known water-soluble alkali metal alkylarylsulfonates as exemplified by sodium decylbenzenesulfonate and sodium dodecylbenzenesulfonate. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 moles of ethylene oxide per mole of sorbitan mono-ester of a higher fatty acid, e.g. oleic acid.

The gas tropodicidal mixture of compounds of this invention can also be advantageously employed in combination with other pesticides, including, for example, nematocides, bactericides, and insecticides. In this manner it is possible to obtain mixtures which are effective against a wide variety of pests and other forms of noxious life.

The actual effective conventration of the mixture of compounds of this invention for gastropodicidal purposes will depend upon the particular adult Gastropoda or its eggs, weather conditions, and whether it is to be applied directly to the water which forms the habitat or egg-laying habitat for the Gastropoda or to land areas which are crossed by amphibious Gastropoda either as the mixture per se or in the form of formulations thereof.

The embodiments of this invention in which an exclusive property or privilege is claimed are defined as follows:

1. A gastropodicidal composition effective to destroy gastropod eggs comprising a mixture on a molecular weight basis of from 0.092 to 0.112 mole of 2',5-dichloro-4'-nitro-3-phenylsalicylanilide, per mole of sodium pentachlorophenate.

2. A method of destroying gastropod eggs which comprises contacting said eggs with a gastropodicidally effective amount of a mixture on a molecular weight basis of between 0.092 and 0.112 mole of 2',5-dichloro-4'-nitro-3-phenylsalicylanilide, per mole of sodium pentachlorophenate.

3. The method of claim 2 wherein the gastropod eggs are in water.

References Cited
UNITED STATES PATENTS

| | | | |
|---|---|---|---|
| 2,789,936 | 4/1957 | Davies | 424—347 X |
| 3,382,145 | 5/1968 | Chupp et al. | 424—230 |
| 3,375,160 | 3/1968 | Early et al. | 424—230 |

OTHER REFERENCES

Shiff, C. J.: Bull. Wld. Hlth. Org. 25, 533–42, 1961.

ALBERT T. MEYERS, Primary Examiner

L. SCHENKMAN, Assistant Examiner